United States Patent [19]
Hori

[11] Patent Number: 5,881,329
[45] Date of Patent: Mar. 9, 1999

[54] MANUAL FILM-ADVANCE DEVICE FOR A MULTIPLE-EXPOSURE AND NORMAL PHOTOGRAPHY CAMERA

[75] Inventor: Masakatsu Hori, Tokyo, Japan

[73] Assignee: Asahi Kogaku Kogyo Kabushiki Kaisha, Tokyo, Japan

[21] Appl. No.: 890,668

[22] Filed: Jul. 9, 1997

[30] Foreign Application Priority Data

Jul. 11, 1996 [JP] Japan .................................... 8-201323

[51] Int. Cl.⁶ ................................................. G03B 41/00
[52] U.S. Cl. .......................................... 396/322; 396/391
[58] Field of Search .................................. 396/322, 323, 396/390, 391, 394, 401

[56] References Cited

U.S. PATENT DOCUMENTS 3,650,191  3/1972  Nomura et al. .......................... 396/391
3,968,508  7/1976  Ikeuchi ..................................... 396/391

*Primary Examiner*—Howard B. Blankenship
*Attorney, Agent, or Firm*—Sughrue, Mion, Zinn, Macpeak & Seas, PLLC

[57] ABSTRACT

A camera is locked in either a multiple-exposure photography state or a normal photography state in association with the initial movement of charge of a shutter to prevent overlapping of frames. When a multiple-exposure/normal photography changeover mechanism (50) is in a normal photography state, a film-advance drive system (20) and a shutter charge drive system (30) are actuated in association with the actuation of a film-advance lever (10). When the multiple-exposure/normal photography changeover mechanism (50) is in a multiple-exposure photography state, a film-overadvancing prevention mechanism (40) is actuated so as to operate only the shutter charge drive system (30) in association with the actuation of the film-advance lever (10). When the multiple-exposure/normal photography changeover mechanism (50) is in a multiple-exposure photography state or a normal photography state, a lock mechanism (60), which operates in association with the commencement of operation of the shutter charge drive system (30) to be actuated with the actuation of the film-advance lever (10), locks the multiple-exposure/normal photography changeover mechanism (50) in either the multiple-exposure photography state or the normal photography state.

14 Claims, 2 Drawing Sheets

← X1
X2 →

← X1
X2 →

MANUAL FILM-ADVANCE DEVICE FOR A MULTIPLE-EXPOSURE AND NORMAL PHOTOGRAPHY CAMERA

BACKGROUND OF THE INVENTION

The present invention relates to a manual film-advance device for a camera, and more particularly to a manual film-advance device for enabling multiple photography in a camera, such as a Brownie film camera, which includes a manual film-advance mechanism and a shutter charge mechanism to be actuated in conjunction with the film-advance operation of the manual film-advance mechanism.

Brownie film cameras usually employ a manual film-advance mechanism, and a focal plane shutter is charged in conjunction with the action of this film-advance mechanism. In addition to this manual film-advance mechanism, the cameras are provided with a multiple-exposure photography mechanism.

When an operation member (hereinafter referred to as a multiple-exposure photography member) provided on a camera body is set to a multiple-exposure photography mode, a conventional multiple-exposure photography mechanism of this Brownie film camera causes a film-advance lock mechanism to lock the film-advance mechanism. If the film-advance lever is actuated in this state, a film will not be advanced, and only the shutter charge mechanism is actuated, whereby the focal plane shutter is charged.

Accordingly, if a shutter release button is pressed, the focal plane shutter is actuated to expose an already once-exposed film, thereby enabling multiple-exposure photography.

However, in the aforementioned conventional manual film-advance device, if the multiple-exposure photography operation member is erroneously actuated during the course of actuation of the film-advance lever at the time of a normal photography operation in which the shutter is charged in conjunction with the advancement of the film, the advancement of the film is interrupted, thereby resulting in overlapping of frames. Further, if a finger is released from the multiple-exposure photography operation member during the course of actuation of the film-advance lever at the time of multiple-exposure photography operation, the multiple-exposure photography operation member returns to its original position, whereby the film-advance lock mechanism releases the film-advance mechanism from a locked state. Consequently, the film is further advanced during the course of actuation of the film-advance lever, thereby resulting in overlapping of frames.

SUMMARY OF THE INVENTION

The present invention has been conceived in view of the aforementioned circumstances, and the object of the present invention is to provide a manual film-advance device for a camera which is capable of preventing overlapping of frames by surely maintaining a selected multiple-exposure photography state or normal photography state in conjunction with the initial shutter charge action.

To accomplish the object, the present invention provides a manual film-advance device for use in a camera including a film-advance drive mechanism and a shutter charge drive mechanism which are actuated in conjunction with the actuation of a film-advance lever from a film-advance starting position to a fully-actuated point, the improvement being characterized by comprising a multiple-exposure/normal photography changeover mechanism for causing switching between a multiple-exposure photography state in which only the shutter charge drive system is actuated in association with the actuation of the film-advance lever and a normal photography state in which the film-advance drive system and the shutter charge drive system are operated in association with the actuation of the film-advance lever; a film-overadvancing prevention mechanism for preventing the film-advance drive mechanism from advancing the film when the multiple-exposure/normal photography changeover mechanism is switched to a multiple-exposure photography state; and a lock mechanism which enables the operation of the multiple-exposure/normal photography changeover mechanism before commencement of the charge of the shutter charge drive system and locks the multiple-exposure photography changeover mechanism in a multiple-exposure photography state or a normal photography state after the shutter charge drive system has been actuated in association with the actuation of the film-advance lever.

The present invention is further characterized by the fact that when the multiple-exposure/normal photography changeover mechanism is in a normal photography state, the film-overadvancing prevention mechanism locks the film-advance drive system regardless of the actuation of the film-advance lever at the moment the film is advanced to a predetermined extent as a result of operation of the film-advance drive system.

The present invention is further characterized by the fact that the film-overadvancing prevention mechanism is provided with a lock lever which pivots when the film has been advanced to a predetermined extent and when the multiple-exposure/normal photography changeover mechanism is switched to the multiple-exposure photography state, and the lock lever is forced so as to release the film-advance drive system from the locked state by forcing means.

The present invention is further characterized by the fact that the multiple-exposure/normal photography changeover mechanism is movable between the normal photography state and the multiple-exposure photography state and is provided with a movable member which actuates the lock lever of the film-overadvancing prevention mechanism in association with the movement of the multiple-exposure/normal photography changeover mechanism, as well as being provided with an operation section for actuating the movable member.

The present invention is further characterized by the fact that the movable member including the operation section is usually forced toward the normal photography position by forcing means.

The present invention is further characterized by the fact that the shutter charge drive system is provided with a charge gear which rotates forward and rearward in association with the pivotal movement of the film-advance lever between the film-advance starting point and the fully-actuated point, and the lock mechanism is provided with a charge-operation linking member which causes the movable member of the multiple-exposure/normal photography changeover mechanism to pivot between a position where the movable member is switchable between the normal photography state and the multiple-exposure photography and a position where the movable member is out of action.

The present invention is further characterized by the fact that the charge-operation linking member engages with and locks the movable member when the multiple-exposure/normal photography mechanism is pivoted to the lock position.

The present invention is further characterized by the fact that the charge-operation linking member is forced to the lock position by forcing means and is pivoted by a pin eccentrically projecting with reference to the charge gear between a position where the multiple-exposure/normal photography changeover mechanism can be switched and a position where the multiple-exposure/normal photography changeover mechanism is locked.

The present invention is directed toward a manual film-advance device for use in a camera including a film-advance drive mechanism and a shutter charge drive mechanism which are actuated in association with the actuation of a film-advance lever, the improvement being characterized by comprising a multiple-exposure/normal photography changeover mechanism for causing switching between a multiple-exposure photography state and a normal photography state; a film-overadvancing prevention mechanism for preventing the film-advance drive mechanism from advancing the film when the multiple-exposure/normal photography changeover mechanism is switched to a multiple-exposure photography state; and a lock mechanism which locks or releases the multiple-exposure/normal photography changeover mechanism in or from the multiple-exposure photography state or the normal photography state.

The present disclosure relates to subject matter contained in Japanese patent application No. 8-201323 (filed on Jul. 11, 1996) which is expressly incorporated herein by reference in its entirety.

DETAILED DESCRIPTION OF THE PREFERRED EMBODIMENT

With reference to the drawings, an embodiment of the present invention will be described hereinbelow.

Figure 1:
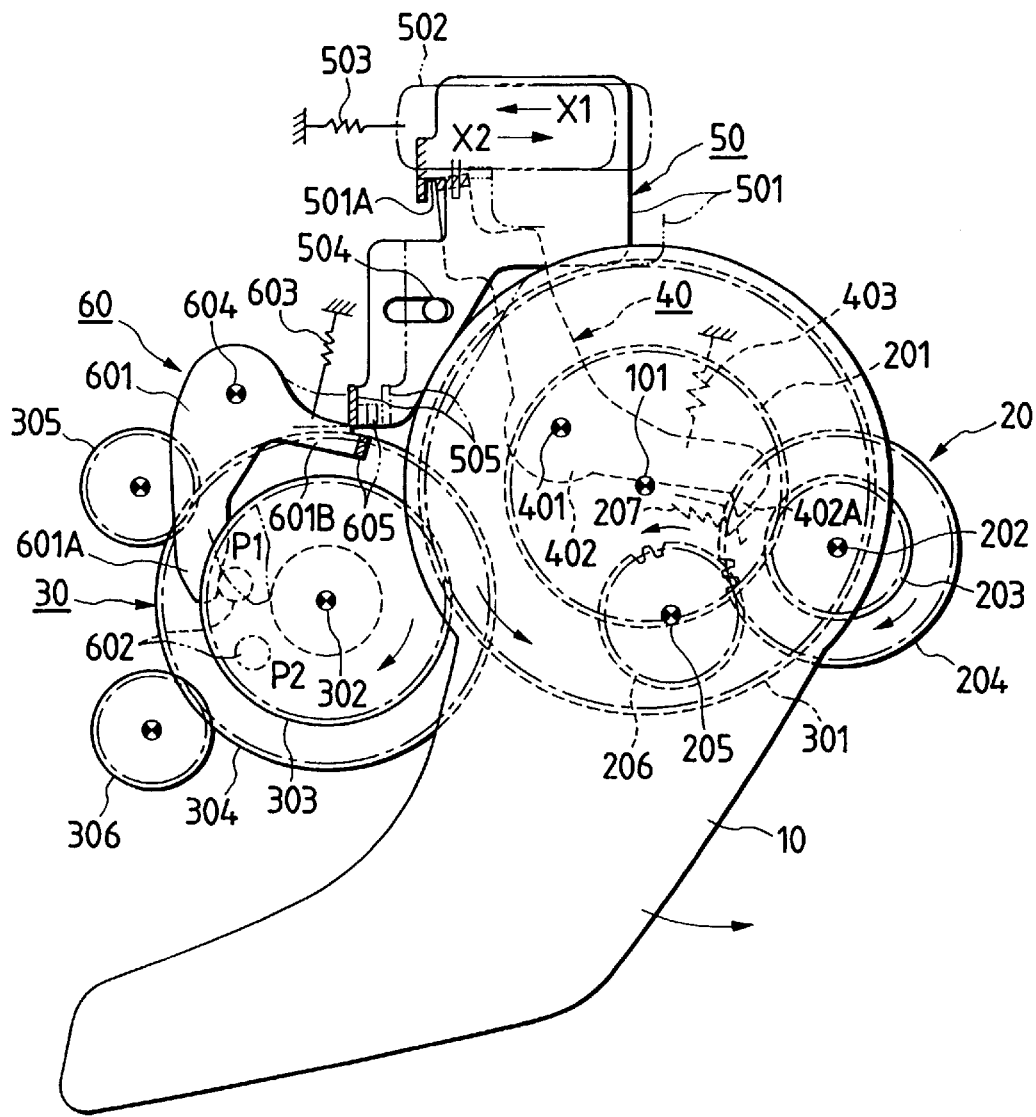
FIG. 1 is a schematic plan view illustrating the configuration of a manual-film advance device for use in a Brownie film camera according to an embodiment of the present invention.

FIG. 1 is a schematic plan view illustrating the configuration of a film-advance device for use in a Brownie film camera according to an embodiment of the present invention.

In FIG. 1, the film-advance device of the camera is comprised of a film-advance lever 10, a film-advance drive system 20 which is actuated in conjunction with the actuation of the film-advance lever 10, a shutter charge drive system 30, a film-overadvancing prevention mechanism 40, a multiple-exposure/normal photography changeover mechanism 50, and a lock mechanism 60.

The film-advance lever 10 is supported by a shaft 101 rotatively provided in a main leaf (not shown) so as to pivot between a film-advance starting point (the original position) and a fully-actuated point (through an angle of about 180 degrees). The film-advance lever 10 is forced so as to automatically return toward the film-advance starting point by means of an unillustrated torsion spring.

The film-advance drive system 20 is comprised of a first gear 201 fixed coaxially with the shaft 101 of the film-advance lever 10, a second gear 203 which meshes with the first gear 201 and is fixed to a shaft 202 rotatively supported by an unillustrated main leaf, a third gear 204 attached to the shaft 202 via an unillustrated one-way clutch for connection only in the direction of advancement of the film; a fourth gear 206 which meshes with the third gear 204 and is rotatively supported by a spool shaft 205 rotatively supported by the unillustrated main leaf; and a spool ratchet wheel 207 which is fixed to the spool shaft 205 and is connected to the fourth gear 206 via an unillustrated friction clutch. The rotation of this ratchet wheel 207 contributes to practical take-up of the film.

The shutter charge drive system 30 is comprised of a main take-up gear 301 rotatively attached to the shaft 101 of the film-advance lever 10, a shutter charge main gear 303 which meshes with the main take-up gear 301 and is rotatively supported by a shaft 302, a pair of upper and lower first and subsequent blind charge gears 304 coaxially attached to the shaft 302 of the shutter charge main gear 303, a first blind pinion gear 305 which meshes with an upper gear of the first/subsequent blind charge gears 304, and a subsequent blind pinion gear 306 which meshes with a lower gear of the first/subsequent blind charge gears 304. The first and subsequent blind pinion gears 305, 306 charge the first and subsequent blinds of a well-known focal plane shutter in conjunction with the actuation of the film-advance lever 10.

The film-overadvancing prevention mechanism 40 inhibits the advancement of a film when the film has been advanced over the extent corresponding to a predetermined one frame, regardless of the actuation of the film-advance lever 10, as well as at the time of a multiple-exposure photography operation. As illustrated in FIG. 1, the film-overadvancing prevention mechanism 40 is comprised of a film-overadvancing prevention lock lever 402 which is rotatively supported at the center by a shaft 401 provided in the unillustrated main leaf. A locking portion 402A formed at one end of the film-overadvancing prevention lock lever 402 engages or disengages with or from the ratchet wheel 207 of the film-advance drive system 20, whereas the other end of the film-overadvancing prevention lock lever 402 is connected to the multiple-exposure/normal photography changeover mechanism 50. Further, the film-overadvancing prevention mechanism 40 is comprised of a spring 403 which forces the lock lever 402 counterclockwise (in the direction in which the locking portion 402A disengages from the ratchet wheel 207).

The multiple-exposure/normal photography changeover mechanism 50 performs switching between a multiple-exposure photography state (in which only the shutter charge drive system 30 is actuated in conjunction with the actuation of the film-advance lever 10) and a normal photography state (in which the film-advance drive system 20 and the shutter charge drive system 30 are actuated in conjunction with the actuation of the film-advance lever 10). The multiple-exposure/normal photography changeover mechanism 50 is provided with a movable member 501, an operation button 502 of the movable member 501, and a spring 503 for returning the movable member 501 and the operation button 502 to their original positions for the normal photography operation.

The movable member 501 is supported in an unillustrated camera body so as to be movable in a tangential direction with respect to the direction of pivotal movement of the lock lever 402 by a support pin 504 (in the directions designated by arrows X1 and X2 in FIG. 1).

The operation button 502 is supported outside the unillustrated camera body so as to be movable in the direction in which the movable member 501 travels, and the operation button 502 is integrally connected to one end of the movable member 501.

An engagement section 501A which loosely engages with the other end of the lock lever 402 is formed at one end of the movable member 501. A locking section 505 is formed so as to downwardly project from the other end of the movable member 501 in the vicinity of the shutter charge gear 303.

The lock mechanism 60 locks the multiple-exposure/ normal photography changeover mechanism 50 in the normal photography operation position or the multiple-exposure photography operation position, in conjunction with the commencement of charge of the shutter. In conjunction with the rotation of the shutter charge gear 303 of the shutter charge drive system 30, the multiple-exposure/ normal photography changeover mechanism 50 is locked in a normal film-feedable position and a multiple-exposure photography operation position. The lock mechanism 60 is comprised of a substantially-L-shaped charge-operation linking member 601, a pin 602 which pivots the charge-operation linking member 601 as the shutter charge gear 303 rotates, and a spring 603 which forces the charge-operation linking member 601.

The charge-operation linking member 601 is disposed in the vicinity of the shutter charge gear 303, and the base of the charge-operation linking member 601 is pivotally supported. The charge-operation linking member 601 is forced counterclockwise in FIG. 1 by the spring 603.

The pin 602 is projectingly formed on a lower surface of the shutter charge gear 303 at a given distance from the center of rotation of the shutter charge gear 303. One end 601A of the charge-operation linking member 601 is adapted to engage with the pins 602.

A locking portion 605 is formed so as to upwardly project from another end 601B of the charge-operation linking member 601 and engages with and disengages from the locking section 505 formed on the other end of the movable member 501.

Next, the operation of the manual film-advance device having the aforementioned structure will be described.

First, the advancement of a film performed at the time of normal photography operation will be described.

In this case, the operation button 502 of the multiple-exposure/normal photography changeover mechanism 50 is moved to the normal photography position by the spring 503. The movable member 501 integral with this operation button 502 is also held in the position indicated by a solid line in FIG. 1.

When the film-advance lever 10 is actuated counterclockwise in FIG. 1 in this state, the rotating action of the gear 201 which rotates together with the film-advance lever 10 is transmitted to the spool shaft 205 via the gears 203, 204, 206, the unillustrated friction clutch, and the ratchet wheel 207, so that the film is taken up.

When the film has been advanced by one frame, the lock lever 402 is pivoted clockwise in FIG. 1 against the spring 403 by means of an unillustrated known controller. The ratchet wheel 207 is locked by engaging with the locking portion 402A of the lock lever 402, thereby interrupting the advancement of the film.

In this case, even in the course of actuation of the film-advance lever 10, the slippage is caused by the unillustrated friction clutch connecting the ratchet wheel 207 to the gear 206. Therefore, the film is prevented from being advanced as a result of actuation of the film-advance lever 10.

When the film-advance lever 10 is actuated in the direction of advancement of the film, the advancement main gear 301 also rotates in the same direction, whereby the rotating action of the advancement main gear 301 is transmitted to the first/subsequent blind pinion gears 305, 306 via the shutter charge main gears 303, and first/subsequent blind charge gears 304 of the shutter charge drive system 30. As a result, the first and subsequent blinds of the known focal plane shutter are charged.

When the unillustrated shutter release button is pressed while the focal plane shutter is in a charged state, the first and subsequent blinds of the focal plane shutter travel, thereby exposing the film.

Figure 2:
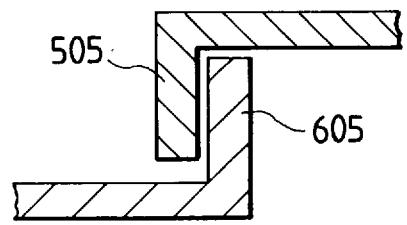
FIG. 2 is a sectional view illustrating an engagement between a locking portion of a charge-operation linking member and a locking section of a movable member in a normal photography mode.

When the shutter charge main gear 303 is rotated in the direction indicated by arrow in FIG. 1 in conjunction with the charging action of the shutter charge drive system 30, the pin 602 which is integrally formed on the shutter charge main gear 303 moves clockwise from a position P1 to a position P2. As a result, the charge-operation linking member 601 is pivoted to the state indicated by a two-dot chain line from the state indicated by a solid line in FIG. 1 by the spring 603, so the locking portion 605 engages with the reverse side of the locking section 505 of the movable member 501 as shown in FIG. 2.

Accordingly, the movement of the movable member 501 in the direction indicated by arrow X2 is obstructed. Therefore, even if the operation button 502 is actuated toward the multiple-exposure photography mode indicated by the arrow X2 in FIG. 1 during the course of actuation of the film-advance lever 1, the movable member 501 can be prevented from moving in that direction.

Further, when the film-advance lever 10 is automatically returned to its original position by the unillustrated torsion spring, the shutter charge main gear 303 is rotated in the direction opposite to the direction indicated by arrow in FIG. 1. Consequently, the pin 602 integrally formed on the shutter charge main gear 303 is returned to the position P1, and concurrently the charge-operation linking member 601 is returned to the state indicated by the solid line in FIG. 1.

Next, the advancement of a film performed at the time of the multiple-exposure photography operation will be described.

In this case, the operation button 602 is actuated in the direction indicated by arrow X2 in FIG. 1 to thereby move the movable member 501 to the position indicated by the two-dot chain line in FIG. 1. In association with this movement, the film-overadvancing prevention lock lever 402 of the film-overadvancing prevention mechanism 40 is pivoted about the shaft 401 clockwise in FIG. 1. The locking portion 402A engages with the ratchet wheel 207 of the film-advance drive system 20, thereby preventing advance of the film.

In this condition, if the film-advance lever 10 is actuated while the operation button 602 is held in the state in which it is actuated in the direction indicated by arrow X2, the main take-up gear 301 is rotated in the same direction. Consequently, the rotating action of the main take-up gear 301 is transmitted to the first/subsequent blind pinion gears 305, 306 via the shutter charge main gear 303 and the pair of upper and lower first and subsequent blind charge gears 304, thereby charging the first and subsequent blinds of the known focal plane shutter.

Figure 3:
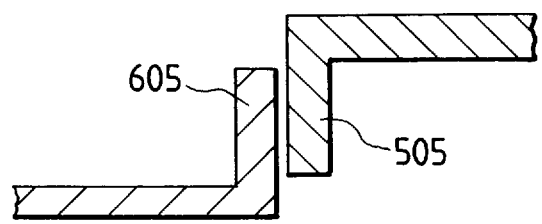
FIG. 3 is a sectional view illustrating an engagement between a locking portion of a charge-operation linking member and a locking section of a movable member in a multiple-exposure photography mode.

In association with the charging action of the shutter charge drive system 30, the shutter charge main gear 303 rotates in the direction indicated by the arrow in FIG. 1. As a result, the pin 602 integrally formed on the shutter charge main gear 303 is released from the end 601A of the charge-operation linking member 601. The charge-operation linking member 601 is pivoted by the spring 603 to the state indicated by the two-dot chain line from the state indicated by the solid line in FIG. 1. Thus, the locking portion 605 engages with the front side of the locking section 505 of the movable member 501 as shown in FIG. 3.

Accordingly, the movable member 501 is prevented from returning in the direction indicated by arrow X1, and concurrently the camera is held in the multiple-exposure photography state even if the finger is released from the operation button 502 during the course of actuation of the film-advance leer 10.

If the unillustrated shutter release button is pressed while the shutter is in a charged state, the first and subsequent blinds of the focal plane shutter travel. Therefore, the film is subjected to multiple exposure.

According to the foregoing embodiment, the film-advance drive system 20 and the shutter charge drive system 30 are actuated in conjunction with the actuation of the film-advance lever 10 when the multiple-exposure/normal photography changeover mechanism 50 is in the normal photography state. In contrast, when the multiple-exposure/normal photography changeover mechanism 50 is in the multiple-exposure photography state, the film-overadvancing prevention mechanism 40 is operated in such a way that only the shutter charge drive system 30 is actuated in conjunction with the actuation of the film-advance lever 10. Further, when the multiple-exposure/normal photograph changeover mechanism 50 is in either the multiple-exposure photography state or the normal photography state, the lock mechanism 60 (which operates in conjunction with the commencement of the operation of the shutter charge drive system 30 to be actuated together with the actuation of the film-advance lever 10) locks the multiple-exposure/normal photography changeover mechanism 50 in either the multiple-exposure photography state or the normal photography state. Therefore, even if the multiple-exposure/normal photography changeover mechanism 50 is erroneously actuated toward the multiple-exposure photography mode during the course of actuation of the film-advance lever 10 at the time of the normal photography operation in which the shutter is charged together with the advancement of the film, the multiple-exposure/normal photography changeover mechanism 50 is prevented from operating. Further, even if the finger is released from the multiple-exposure/normal photography changeover mechanism 50 during the course of the actuation of the film-advance lever 10, the multiple-exposure/normal photography changeover mechanism 50 is prevented from moving to the normal photography mode, enabling prevention of overlapping of frames.

As is apparent from the foregoing descriptions, in a manual film-advance device for use in a camera including a film-advance drive system and a shutter charge drive system which operate in conjunction with the actuation of a film-advance lever, a selected multiple-exposure photography state or normal photography state can be maintained with use of the shutter charge operation, and thus the overlapping of frames can be surely avoided.

What is claimed is:

1. A manual film-advance device for use in a camera including a film-advance drive system and a shutter charge drive system which are actuated in conjunction with actuation of a film-advance lever from a film-advance starting position to a fully-actuated point, the device comprising:

a multiple-exposure/normal photography changeover mechanism for switching a photography mode between a multiple-exposure photography state wherein only the shutter charge drive system is actuated in association with the actuation of the film-advance lever and a normal photography state wherein the film-advance drive system and the shutter charge drive system are both actuated in association with the actuation of the film-advance lever;

a film-overadvancing prevention mechanism for preventing the film-advance drive system from advancing the film when the photography mode is switched to a multiple-exposure photography state by the multiple-exposure/normal photography changeover mechanism; and a lock mechanism for permitting operation of the multiple-exposure/normal photography changeover mechanism before the shutter charge drive system is actuated in association with the actuation of the film-advance lever, and locking the multiple-exposure normal photography changeover mechanism so that a selected one of the multiple-exposure photography state and the normal photography state is maintained after the shutter charge drive system is actuated in association with the actuation of the film-advance lever.

2. The manual film-advance device for use in a camera as defined in claim 1, wherein if the photograph mode is in the normal photography state, the film-overadvancing prevention mechanism locks the film-advance drive system regardless of the actuation of the film-advance lever at a moment when the film has been advanced to a predetermined extent by actuation of the film-advance drive system.

3. The manual film-advance device for use in a camera as defined in claim 1 or 2, wherein the film-overadvancing prevention mechanism includes:

a lock lever which is pivotably moved to establish a locked condition of the film advancing drive system in association with at least one of operations wherein the film has been advanced to a predetermined extent and wherein the multiple-exposure/normal photography changeover mechanism has switched the photography mode to the multiple-exposure photography state; and means for biasing the lock lever to release the film-advance drive system from the locked condition.

4. The manual film-advance device for use in a camera as defined in claim 1 or 2, wherein the multiple-exposure/normal photography changeover mechanism includes:

a movable member movable between a first position for the normal photography state and a second position for the multiple-exposure photography state, wherein the movable member actuates, in association with its movement, a lock lever of the film-overadvancing prevention mechanism; and an operation section for operating the movable member.

5. The manual film-advance device for use in a camera as defined in claim 4, further comprising:

means for constantly biasing the movable member together with the operation section toward the first state for the normal photography position.

6. The manual film-advance device for use in a camera as defined in claim 1 or 2, wherein the shutter charge drive system includes a charge gear which reciprocally rotates in association with pivotal movement of the film-advance lever between the film-advance starting point and the fully-actuated point, and the lock mechanism includes a charge-operation linking member which pivots between a first position wherein a movable member of the multiple-exposure/normal photography changeover mechanism is operable to switch the photography mode between the normal photography state and the multiple-exposure photography state, and a second position wherein the movable member is inhibited from switching the photography mode between the normal photography state and the multiple-exposure photography state.

7. The manual film-advance device for use in a camera as defined in claim 6, wherein the charge-operation linking member in said second position engages with the movable member to thereby lock the movable member.

8. The manual film-advance device for use in a camera as defined in claim 6, further comprising:

means for biasing the charge-operation linking member toward the second position; and a pin eccentrically arranged and projected with reference to the charge gear for pivotally moving the charge-operation linking member between the first and second positions.

9. A manual film-advance device for use in a camera including a film-advance drive system and a shutter charge drive system which are actuated in association with actuation of a film-advance lever, the device comprising:

a multiple-exposure/normal photography changeover mechanism switchable between a multiple-exposure photography state and a normal photography state;

a film-advancing prevention mechanism for preventing the film from being advanced when the multiple-exposure/normal photography changeover mechanism is switched to the multiple-exposure photography state; and a lock mechanism for locking the multiple-exposure/normal photography changeover mechanism in one of the multiple-exposure photography state and the normal photography state, and for releasing the multiple-exposure/normal photography changeover mechanism from one of the multiple-exposure photography state and the normal photography state.

10. A manual film-advance device for use in a camera including a film-advance drive system and a shutter charge drive system which are actuated in conjunction with actuation of a film-advance lever from a film-advance starting position to a fully-actuated point, the device comprising:

a multiple-exposure/normal photography changeover mechanism which actuates both the film-advance drive system and the shutter charge drive system in conjunction with the actuation of the film-advance lever when the multiple-exposure/normal photography changeover mechanism is in a normal photography state, and which actuates a film-overadvancing prevention mechanism so as to actuate only the shutter charge drive mechanism in conjunction with the actuation of the film-advance lever when the multiple-exposure/normal photography changeover mechanism is in a multiple-exposure photography state; and a lock mechanism which operates in conjunction with commencement of operation of the shutter charge drive system actuated in conjunction with the actuation of the film-advance lever when the multiple-exposure/normal photography changeover mechanism is in the multiple-exposure photography state or the normal photography state, and which locks the multiple-exposure/normal photography changeover mechanism in the multiple-exposure photography state or the normal photography state.

11. A manual film-advance device for use in a camera including a film-advancing system and a shutter charge drive system, the device comprising:

a movable member having a multiple-exposure/normal photography changeover operation button, the movable member being associated with the film-advancing system and movable between first and second positions; and a change-operation linking member driven by the shutter charge drive system from a third position to a fourth position, wherein the change-operation linking member in said fourth position is engageable with the movable member in said first position to inhibit the movable member from moving toward said second position, and engageable with the movable member in said second position to inhibit the movable member from moving toward the first position.

12. The manual film-advance device as defined in claim 11, wherein the movable member in said first position establishes a normal photography mode and the movable member in said second position establishes a multiple-exposure photography mode.

13. The manual film-advance device as defined in claim 12, wherein the change-operation linking member inhibits movement of the movable member during when at least one of the film-advancing system and the shutter charge drive system is activated.

14. The manual film-advance device as defined in claim 13, wherein the movable member in said second position brings a lock lever into engagement with a rachet wheel of the film-advancing system.

* * * * *